United States Patent [19]

Sommargren

[11] Patent Number: 4,687,958
[45] Date of Patent: Aug. 18, 1987

[54] APPARATUS TO TRANSFORM A SINGLE FREQUENCY, LINEARLY POLARIZED LASER BEAM INTO A HIGH EFFICIENCY BEAM WITH TWO, ORTHOGONALLY POLARIZED FREQUENCIES

[75] Inventor: Gary E. Sommargren, Madison, Conn.

[73] Assignee: Zygo Corporation, Middlefield, Conn.

[21] Appl. No.: 710,927

[22] Filed: Mar. 12, 1985

[51] Int. Cl.[4] .................................................. G02F 1/35
[52] U.S. Cl. ..................................... 307/425; 350/358
[58] Field of Search .......................... 307/425; 350/358

[56] References Cited

PUBLICATIONS

C. H. Claassen, "Efficiency Stabilization for Multi--Beam Acousto-Optic Modulators", IBM TDB, vol. 22, No. 5, Oct. 1979, pp. 2073.

*Primary Examiner*—James W. Davie
*Attorney, Agent, or Firm*—Stiefel, Gross, Kurland & Pavane

[57] ABSTRACT

An electro-optical apparatus transforms a single stabilized frequency, linearly polarized laser input beam (18) from a light source (10) into an output beam (28) having two collinear orthogonally polarized output beam components (24,26) differing in frequency from each other by the frequency of a frequency stabilized electrical signal (32) provided from an electronic oscillator (30). The input of the oscillator (30) is provided to a power amplifier (34) which is used to drive a piezoelectric transducer (40) affixed to an acousto-optical Bragg cell (44) through which the input beam (18) passes and is transformed into the output beam (28) composed of the two beam components (24,26). The electrical output (36) of the power amplifier (34) is adjusted so that each of the output beam components (24,26) have approximately the same intensity which is each approximately half of the input beam (18) to provide a nominal efficiency of about 100%.

27 Claims, 2 Drawing Figures

APPARATUS TO TRANSFORM A SINGLE FREQUENCY, LINEARLY POLARIZED LASER BEAM INTO A HIGH EFFICIENCY BEAM WITH TWO, ORTHOGONALLY POLARIZED FREQUENCIES

CROSS-REFERENCE TO RELATED APPLICATIONS

This application relates to the commonly owned U.S. patent applications entitled "Heterodyne Interferometer System" naming Gary E. Sommargren and Moshe Schaham as joint inventors thereof, bearing U.S. Ser. No. 710,928, filed Mar. 12, 1985 and "Apparatus to Transform a Single Frequency, Linearly Polarized Laser Beam Into a Beam With Two, Orthogonally Polarized Frequencies" naming Gary E. Sommargren as sole inventor thereof, bearing U.S. Ser. No. 710,859, filed Mar. 12, 1985, and the contents of which are specifically incorporated by reference herein.

BACKGROUND OF THE INVENTION

1. Field of the Invention

The present invention relates to apparatus for transforming a single frequency, linearly polarized laser beam into a high efficiency beam with two, orthogonally polarized frequencies. More particularly, the invention relates to electro-optical apparatus which are useful in a variety of optical measuring devices which perform extremely accurate measurement of changes in either length or optical length.

2. The Prior Art

The use of optical interferometry to measure changes in either length, distance, or optical length has grown significantly due not only to technological advances in lasers, photosensors, and microelectronics but also to an ever increasing demand for high precision, high accuracy measurements. The prior art interferometers can be generally categorized into two types based on the signal processing technique used, i.e., either homodyne or heterodyne. The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies. In the prior art two-optical frequency heterodyne interferometers, the two optical frequencies are produced by one of the following techniques: (1) use of a Zeeman split laser, see for example, Bagley et al, U.S. Pat. No. 3,458,259, issued Jul. 29, 1969; G. Bouwhuis, "Interferometrie Met Gaslasers," Ned. T. Natuurk, vol. 34, pp. 225–232 (Aug. 1968) *Hewlett Packard Journal* (Aug. 1970); Bagley et al, U.S. Pat. No. 3,656,853, issued Apr. 18, 1972; *Hewlett-Packard Journal* (Apr. 1983); and H. Matsumoto, "Recent interferometric measurements using stabilized lasers," *Precision Engineering*, vol. 6, pp. 87–94); (2) use of a pair of acousto-optic Bragg cells, see for example, Y. Ohtsuka and K. Itoh, "Two-frequency laser interferometer for small displacement measurements in a low frequency range," *Applied Optics*, vol. 18, pp. 219–224 (15 Jan. 1979); N. Massie et al., "Measuring laser flow fields with a 64-channel heterodyne interferometer," *Applied Optics*, vol. 22, pp. 2141–2151 (1983); Y. Ohtsuka and M. Tsubokawa, "Dynamic two-frequency interferometry for small displacement measurements," *Optics and Laser Technology*, Vol. 16, pp. 25–29 (Feb. 1984); H. Matsumoto, *op.cit;* or (3) use of two longitudinal modes of a randomly polarized HeNe laser, see for example, J. B. Ferguson and R. H. Morris, "Single Mode Collapse in 6328-Å He-Ne lasers," *Applied Optics*, vol. 17, pp. 2924–2929 (1978).

In addition, my copending U.S. patent application Ser. No. 710,859 entitled "Apparatus to Transform a Single Frequency, Linearly Polarized Laser Beam Into a Beam With Two Orthogonally Polarized Frequencies," filed Mar. 12, 1986 and assigned to the assignee of this application, discloses an apparatus for producing a beam with two orthogonally polarized optical frequencies. Although the apparatus disclosed in the above copending application is satisfactory in certain circumstances, it is not as efficient as the apparatus described herein. Thus, the present apparatus, as compared with the apparatus of the aforementioned copending patent application, (1) provides approximately twice the efficiency, i.e., approximately 100% of the input beam intensity is transformed into the output beam as compared with 50%; (2) requires fewer components; and (3) operates with collinear output beams thereby simplifying alignment considerations.

As for the prior art use of a Zeeman split laser to produce the two optical frequencies, this approach is only applicable to certain lasers (e.g., HeNe) and limits the frequency difference between the two optical frequencies to about 2 MHz. This imposes a limit on the maximum rate of change of the length or optical length being measured. In addition, the available power from a Zeeman split laser is less than 500 microwatts which can be a serious limitation when one laser source must be used for the measurement of multiple axes, such as three to six axes.

As for the prior art use of two Bragg cells to produce the two optical frequencies, this approach requires a complex, expensive apparatus which is susceptible to a number of sources of error and alignment difficulties.

Finally, although the prior art use of two longitudinal modes of a randomly polarized HeNe laser provides a laser beam with two orthogonally polarized frequencies in a rather convenient, cost-effective form, the frequency difference is approximately 500–600 MHz which requires complicated, expensive detection and processing electronics. Furthermore, by starting with such a high frequency difference, the task of resolution extension becomes difficult and expensive.

Consequently, while prior art techniques for producing a laser beam with two optical frequencies of orthogonal polarization are useful for some applications, none known to applicant provide the technical performance in a commercially viable form for applications requiring the measurement of rapidly changing lengths (distances) to extremely high resolution. These disadvantages of the prior art are overcome by the present invention.

SUMMARY OF THE INVENTION

In accordance with the instant invention, electro-optical apparatus capable of transforming a single frequency, $f_L$, linearly polarized laser beam into a beam with two orthogonally polarized frequencies is provided which comprises: (1) a source of a stabilized single frequency, linearly polarized input beam, most preferably a laser; (2) means, most preferably a frequency stabilized electronic oscillator, to provide an electrical signal of frequency $f_o$; (3) means, most preferably an electronic amplifier, for delivering said electrical signal to, (4), means most preferably an acousto-optical device comprised of a piezoelectric transducer bonded to a uniaxial crystal which transforms said input beam into two parallel output beams which are orthogonally polarized, which differ in frequency by $f_o$, and which each contain one-half the intensity of said input beam.

THE DRAWINGS

DETAILED DESCRIPTION OF THE INVENTION

Figure 1:
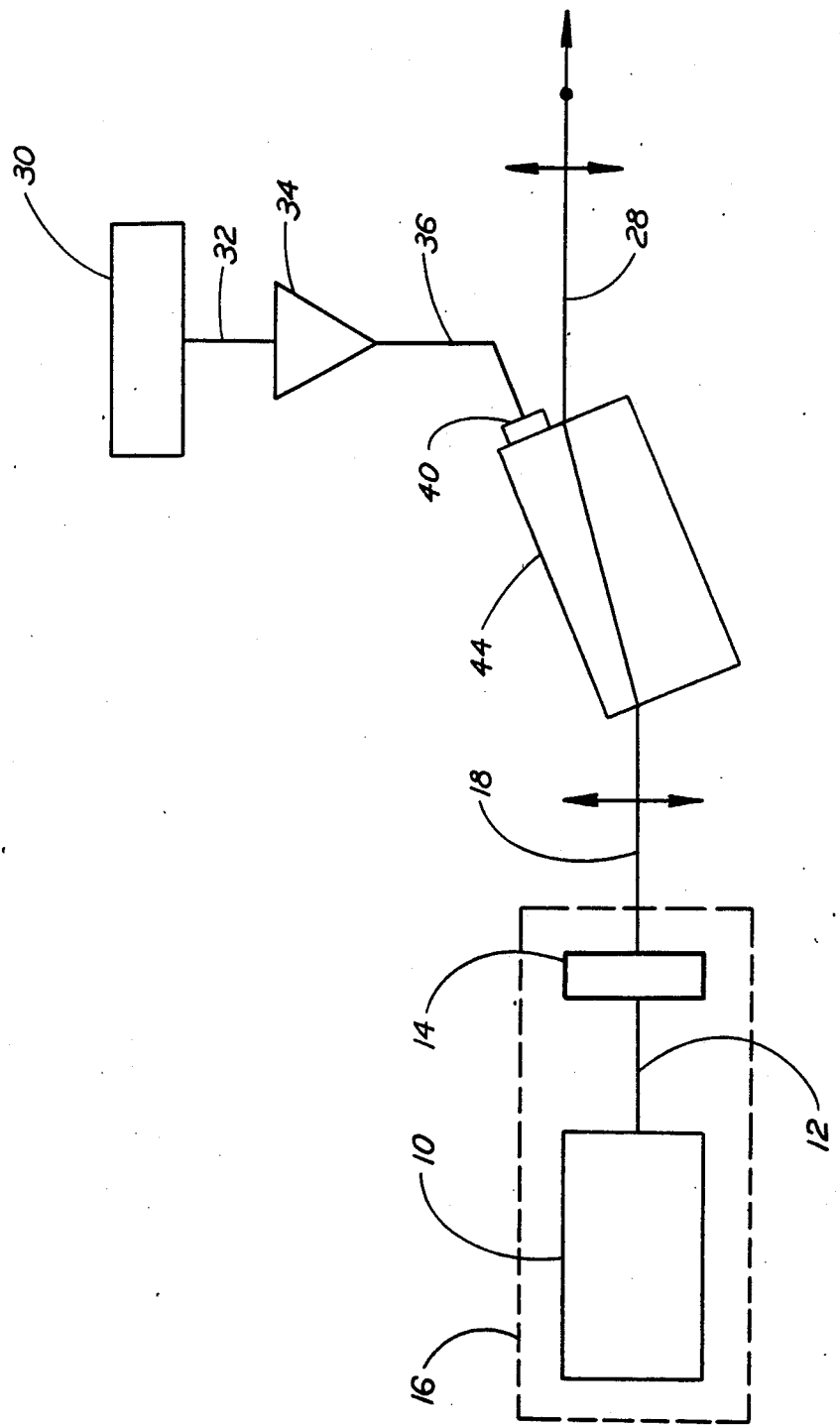
FIG. 1 depicts in schematic form an embodiment of the instant invention.

FIG. 1 depicts in schematic form a presently preferred embodiment of the instant invention. While the apparatus has application for a wide range of radiation sources, the following description is taken by way of example with respect to an optical measuring system. The term "radiant energy" as used herein includes, but is not limited to, electromagnetic energy of all frequency ranges. A light source (10), most preferably a laser, provides a beam (12) of optical energy which has a single, stabilized frequency and is linearly polarized. Light source (10) can be any of a variety of lasers. For example, it can be a gas laser, e.g. a helium-neon, stabilized in any of a variety of conventional techniques known to those skilled in the art to produce beam (12), see for example, T. Baer et al, "Frequency satbilization of a 0.633 μm He-Ne-longitudinal Zeeman laser," *Applied Optics*, vol. 19, pp. 3173–3177 (1980); Burgwald et al, U.S. Pat. No. 3,889,207, issued June 10, 1975; and Sandstrom et al, U.S. Pat. No. 3,662,279, issued May 9, 1972. Alternatively, light source (10) can be a diode laser frequency stabilized in one of a variety of conventional techniques known to those skilled in the art to produce beam (12), see for example, T. Okoshi and K. Kikuchi, "Frequency Stabilization of Semiconductor Lasers for Heterodyne-type Optical Communication Systems," *Electronic Letters*, Vol. 16, pp. 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, Vol. QE-19, pp. 1514–1519 (1983). The specific device used for source (10) will determine the diameter and divergence of beam (12). For some sources, e.g. a diode laser, it is necessary to use beam forming optics (14), e.g. a conventional microscope objective, to provide an input beam (18) with a suitable diameter and divergence for the elements that follow. When source (10) is a helium-neon laser, for example, beam forming optics (14) may not be required. The elements (10) and (14) are shown in a dashed box (16) which is the source of the input beam (18) which has one stabilized frequency fL and is linearly polarized in the plane of FIG. 1. Electrical oscillator (30) preferably provides a frequency stabilized electrical signal (32) of frequency fo to a conventional power amplifier (34). The electrical output (36) of this power amplifier (34) is preferably used to drive a conventional piezoelectric transducer (40) l0 affixed to an acousto-optical Bragg cell (44).

Figure 2:
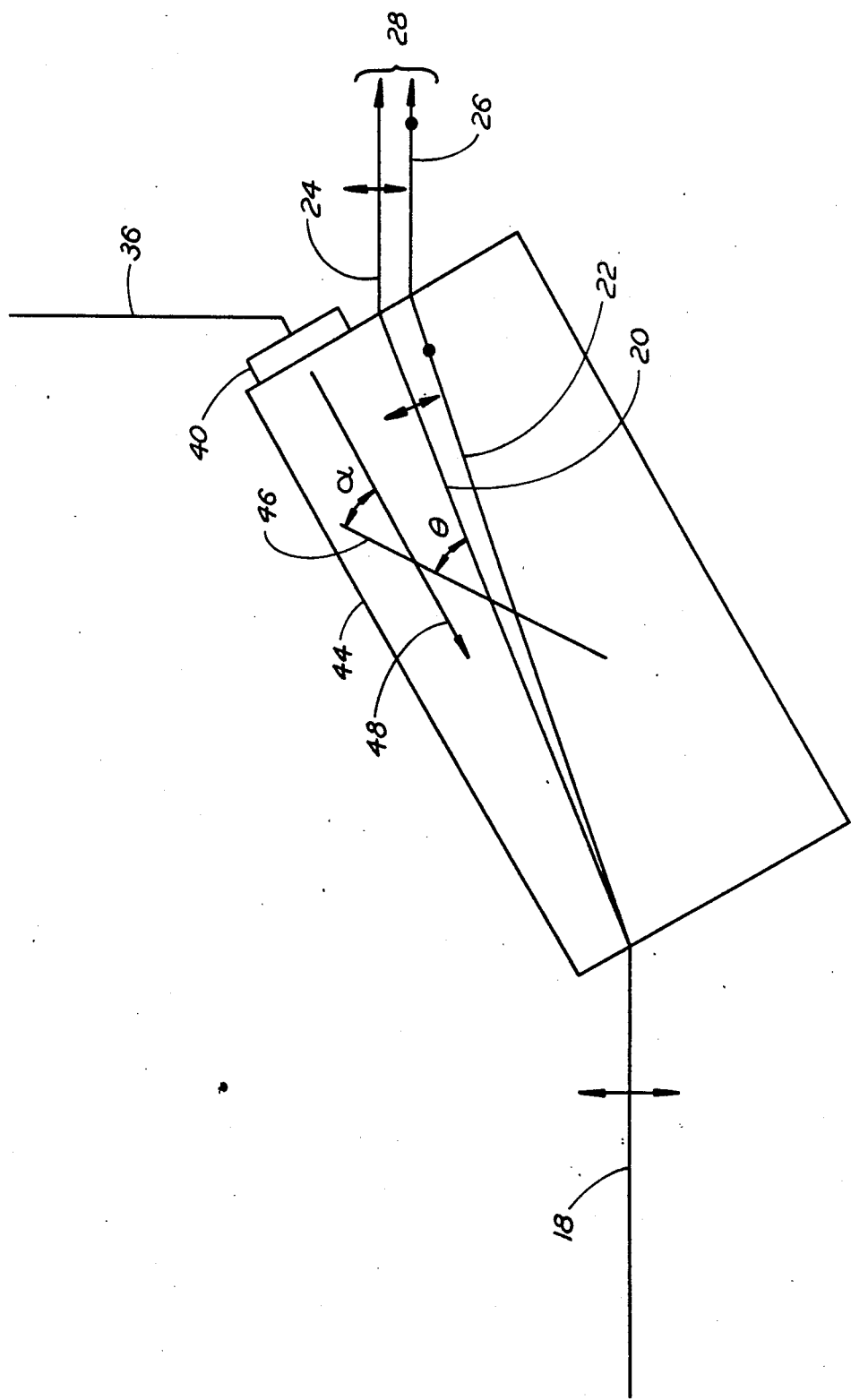
FIG. 2 depicts in schematic form the detailed propagation of the light beams through the acousto-optical Bragg cell of FIG. 1.

FIG. 2 depicts in schematic form the detailed propagation of the input beam (18) through the acousto-optical Bragg cell (44). The presently preferred acousto-optical Bragg cell is made of a uniaxial crystal (e.g., quartz) having an optical axis (46) in the plane of FIG. 2 which makes an angle α with the direction of propagation of the acoustic wave (48) generated by the piezoelectric transducer (40). The input beam (18) enters the acousto-optical Bragg cell (44), becoming extraordinarily polarized beam (20), at an angle $\Theta$ to the optical axis (46). Due to the photoelastic interaction of this beam (20) with the acoustic wave (48) (see for example, R. W. Dixon, "Acoustic Diffraction of Light in Anisotropic Media," *IEEE Journal of Quantum Electronics*, vol. QE-3, pp. 85–93 (1967)), ordinarily polarized beam (22) is generated by Bragg diffraction when the following relationship is satisfied.

$$f_o = \frac{v}{\lambda} [n_i \cos(\theta - \alpha) - \sqrt{n_o^2 - n_i^2 \sin^2(\theta - \alpha)}\,]$$

where $$n_i^2 = \frac{n_o^2 n_e^2}{n_e^2 \cos^2\theta + n_o^2 \sin^2\theta}$$

v = velocity of the acoustic wave
λ = wavelength of incident light
$n_o$ = ordinary refractive index of the crystal
$n_e$ = extraordinary refractive index of the crystal This ordinarily polarized beam (22) propagates at a small angle to that of the extraordinarily polarized beam (20). In addition, the frequency of this beam (22) is $f_L + f_o$ while the frequency of the extraordinarily polarized beam (20) is $f_L$ and the polarization of this beam (22) is orthogonal to that of the extraordinarily polarized beam (20). These beams (20) and (22) exit the acousto-optical Bragg cell (44), through the crystal face on which the piezoelectric transducer (40) is fixed, becoming beams (24) and (26), respectively. Under this exit condition, beams (24) and (26) are parallel and spatially displaced by a minute amount, only a small fraction of the beam diameter. For purposes of illustration, this displacement is shown greatly exaggerated in FIG. 2. Preferably, the electrical output (36) of the power amplifier (34) is adjusted so that exit beams (24) and (26) each have approximately the same intensity which is approximately one-half that of input beam (18), for a total intensity of about 100% for the output beam (28). Consequently, the output beam (28) is then composed of the two beam components (24) and (26) which are collinear, orthogonally polarized, and differ in frequency by $f_o$, while transforming essentially 100% of the input beam (18) intensity into the output beam (28).

Thus, some advantages of the instant invention are: (1) a higher, selectable frequency difference between the two orthogonally polarized components of the output beam, e.g. a tunable frequency range of 2–150 MHz as opposed to 0.6–2 MHz for a Zeeman split laser source; (2) a higher beam intensity; (3) a nominally 100% efficiency; (4) the output beams are collinear; (5) the frequency difference is insensitive to external magnetic fields; (6) a small number of components; (7) ease of alignment; and (8) independence of the two frequency forming apparatus from the laser source, i.e., the instant invention can be used with either gas lasers or diode lasers.

While a preferred embodiment of the invention has been disclosed, obviously modifications can be made therein, without departing from the scope of the invention as defined in the following claims:

What is claimed is:

1. An electro-optical apparatus comprising a light source for providing a linearly polarized single stabilized first frequency optical input beam having an associated intensity; means for providing a second frequency stabilized electrical signal; and means connected to both said input beam providing means and said electrical signal providing means for transforming said input beam into an output beam having two collinear orthogonally polarized output beam components different in frequency from each other by the frequency of said second frequency stabilized electrical signal while each containing substantially one half of said input beam associated intensity; whereby said output beam has substantially 100% of said input beam associated intensity for providing nominally a 100% efficiency for said electro-optical apparatus.

2. An apparatus in accordance with claim 1 wherein said transforming means comprises an acousto-optical device means.

3. An apparatus in accordance with claim 2 wherein said acousto-optical device means comprises piezoelectric transducer means.

4. An apparatus in accordance with claim 3 wherein said acousto-optical device means further comprises uniaxial crystal means, said piezoelectric transducer means being bonded to said uniaxial crystal means.

5. An apparatus in accordance with claim 4 wherein said second frequency stabilized electrical signal providing means comprises frequency stabilized electronic oscillator means for providing said second frequency stabilized electrical signal.

6. An apparatus in accordance with claim 5 wherein said electrical signal providing means further comprises power amplifier means electrically connected between said electronic oscillator means and said acousto-optical device means for delivering said electrical signal to said acousto-optical device means.

7. An apparatus in accordance with claim 6 wherein said uniaxial crystal means comprises an acousto-optical Bragg cell, said input beam being disposed to enter said acousto-optical Bragg cell, said piezoelectric transducer means generating an acoustic wave, said Bragg cell having an optical axis disposed at an angle to the direction of propagation of said acoustic wave.

8. An apparatus in accordance with claim 7 wherein said input beam after entering said Bragg cell interacts with said acoustic wave for transforming said input beam into said output beam components as said interacted input beam exits said Bragg cell, said output beam components being collinear.

9. An apparatus in accordance with claim 8 wherein said power amplifier means comprises means for driving said piezoelectric transducer means.

10. An apparatus in accordance with claim 9 wherein said power amplifier means further comprises means for adjusting the electrical output thereof for adjusting the intensity of said output beam components.

11. An apparatus in accordance with claim 10 wherein said light source comprises a laser, said input beam being a laser beam.

12. An apparatus in accordance with claim 11 wherein said laser comprises a helium neon gas laser.

13. An apparatus in accordance with claim 11 wherein said laser comprises a diode laser.

14. An apparatus in accordance with claim 13 wherein said light source further comprises beam forming optics associated with said diode laser for providing said input beam.

15. An apparatus in accordance with claim 1 wherein said light source comprises a laser, said input beam being a laser beam.

16. An apparatus in accordance with claim 15 wherein said laser comprises a helium neon gas laser.

17. An apparatus in accordance with claim 15 wherein said laser comprises a diode laser.

18. An apparatus in accordance with claim 17 wherein said light source further comprises beam forming optics associated with said diode laser for providing said input beam.

19. An apparatus in accordance with claim 1 wherein said second frequency stabilized electrical signal providing means comprises frequency stabilized electronic oscillator means for providing said second frequency stabilized electrical signal.

20. An apparatus in accordance with claim 19 wherein said transforming means comprises an acousto-optical device means.

21. An apparatus in accordance with claim 20 wherein said electrical signal providing means further comprises power amplifier means electrically connected between said electronic oscillator means and said acousto-optical device means for delivering said electrical signal to said acousto-optical device means.

22. An apparatus in accordance with claim 2 wherein said acousto-optical device means comprises a Bragg cell.

23. An apparatus in accordance with claim 21 wherein said power amplifier means further comprises means for adjusting the electrical output thereof for adjusting the intensity of said output beam components.

24. An apparatus in accordance with claim 22 wherein said light source comprises a laser, said input beam being a laser beam.

25. An apparatus in accordance with claim 24 wherein said laser comprises a helium neon gas laser.

26. An apparatus in accordance with claim 24 wherein said laser comprises a diode laser.

27. An apparatus in accordance with claim 26 wherein said light source further comprises beam forming optics associated with said diode laser for providing said input beam.

* * * * *